(12) United States Patent
Ito et al.

(10) Patent No.: US 10,236,745 B2
(45) Date of Patent: Mar. 19, 2019

(54) MOTOR

(71) Applicant: Nidec Corporation, Kyoto (JP)

(72) Inventors: Michihiro Ito, Kyoto (JP); Mitsuo Kodama, Kyoto (JP); Tadashi Hasegawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 368 days.

(21) Appl. No.: 15/356,742

(22) Filed: Nov. 21, 2016

(65) Prior Publication Data
US 2017/0353076 A1 Dec. 7, 2017

Related U.S. Application Data

(60) Provisional application No. 62/346,670, filed on Jun. 7, 2016.

(51) Int. Cl.
| | |
|---|---|
| *H02K 5/22* | (2006.01) |
| *H02K 3/52* | (2006.01) |
| *H02K 19/00* | (2006.01) |
| *H02K 21/00* | (2006.01) |

(52) U.S. Cl.
CPC ............ *H02K 5/225* (2013.01); *H02K 3/522* (2013.01); *H02K 19/00* (2013.01); *H02K 21/00* (2013.01); *H02K 2203/03* (2013.01)

(58) Field of Classification Search
CPC ......... H02K 21/00; H02K 19/00; H02K 5/225
USPC .......................................... 310/46, 68 R, 71
See application file for complete search history.

(56) References Cited

U.S. PATENT DOCUMENTS

| | | | |
|---|---|---|---|
| 8,416,524 B2 | 4/2013 | Saichi et al. | |
| 8,593,759 B1 * | 11/2013 | Matsumoto | H02K 3/522 360/99.08 |
| 8,643,978 B1 * | 2/2014 | Matsumoto | H02K 3/522 310/90 |
| 2005/0206255 A1 * | 9/2005 | Yoshino | H02K 3/522 310/71 |
| 2007/0046127 A1 * | 3/2007 | Kloeppel | H02K 3/18 310/180 |
| 2011/0249362 A1 | 10/2011 | Saichi et al. | |

(Continued)

FOREIGN PATENT DOCUMENTS

JP 2011-234602 A 11/2011

*Primary Examiner* — Gary A Nash
(74) *Attorney, Agent, or Firm* — Keating & Bennett, LLP

(57) ABSTRACT

A circuit board is in the shape of a strip and includes: in one longitudinal end portion thereof, power connection portions connected to an external power supply; in another longitudinal end portion thereof, land portions to which portions of conducting wires drawn out downwardly of a base portion are connected; and pattern portions electrically connected to the power connection portions and the land portions. The land portions include a first land portion, and a second land portion arranged adjacent to the first land portion. The pattern portions include a first pattern portion electrically connected to the first land portion, and a second pattern portion arranged adjacent to the first pattern portion, and electrically connected to the second land portion. The first pattern portion and the second land portion are arranged to overlap with each other when viewed in a widthwise direction of the circuit board. Alternatively or additionally, the first and second land portions are arranged to overlap with each other when viewed in a longitudinal direction of the circuit board.

20 Claims, 10 Drawing Sheets

(56) References Cited

U.S. PATENT DOCUMENTS

| | | | | |
|---|---|---|---|---|
| 2014/0153132 A1* | 6/2014 | Sato | ........................ | H02K 3/50 360/99.08 |
| 2015/0036475 A1* | 2/2015 | Shiraishi | ............ | G11B 19/2036 369/258.1 |
| 2015/0138670 A1* | 5/2015 | Sato | ........................ | H02K 3/50 360/99.08 |

* cited by examiner

MOTOR

CROSS REFERENCE TO RELATED APPLICATIONS

This application claims the benefit of priority to U.S. Patent Application No. 62/346,670 filed on Jun. 7, 2016. The entire contents of this application are hereby incorporated herein by reference.

BACKGROUND OF THE INVENTION

1. Field of the Invention

The present invention relates to a motor.

2. Description of the Related Art

Motors arranged to rotate disks are typically installed in hard disk apparatuses and optical disk apparatuses. A known motor is described in, for example, JP-A 2011-234602. In this known motor, lead wires extending from coils are arranged to pass through through holes passing through a base portion and communicating grooves defined in a lower surface of the base portion, and are electrically connected to a circuit board.

In a configuration described in JP-A 2011-234602, each of the lead wires is connected to the circuit board through a solder. In addition, connection points are sufficiently spaced from one another in a circumferential direction to prevent a continuity between the connection points. In this case, however, an accommodating portion recessed upward to accommodate portions of the lead wires on the lower surface of the base portion needs to have a large circumferential dimension. This may lead to a reduction in rigidity of the base portion.

The present invention has been conceived to provide a configuration that is able to achieve a reduction in the area of a circuit board while preventing a continuity between points of connection between lead wires and the circuit board, and also to provide a configuration that is able to minimize a reduction in rigidity of a motor even in the case where a circuit board is arranged on a lower surface of a base portion.

SUMMARY OF THE INVENTION

A motor according to a preferred embodiment of the present invention includes a stationary portion, and a rotating portion arranged to be rotatable about a central axis extending in a vertical direction. The stationary portion includes a plate-shaped base portion arranged to extend perpendicularly to the vertical direction, a stator arranged above the base portion, and a circuit board arranged below the base portion. The base portion includes a plurality of base through holes each of which passes through the base portion in an axial direction. The stator includes a stator core including a plurality of teeth arranged to project radially outward, and a plurality of coils defined by a plurality of conducting wires wound around the teeth. Portions of the conducting wires which extend from the coils are drawn out downwardly of the base portion through the corresponding base through holes. The circuit board is in a shape of a strip, and includes: in one longitudinal end portion thereof, a plurality of power connection portions connected to an external power supply; in another longitudinal end portion thereof, a plurality of land portions to which the portions of the conducting wires drawn out downwardly of the base portion are connected; and a plurality of pattern portions electrically connected to the power connection portions and the land portions. The land portions include a first land portion, and a second land portion arranged adjacent to the first land portion. The pattern portions include a first pattern portion electrically connected to the first land portion, and a second pattern portion arranged adjacent to the first pattern portion, and electrically connected to the second land portion. The first pattern portion and the second land portion are arranged to overlap with each other when viewed in a widthwise direction of the circuit board.

A motor according to another preferred embodiment of the present invention includes a stationary portion, and a rotating portion arranged to be rotatable about a central axis extending in a vertical direction. The stationary portion includes a plate-shaped base portion arranged to extend perpendicularly to the vertical direction, a stator arranged above the base portion, and a circuit board arranged below the base portion. The base portion includes a plurality of base through holes each of which passes through the base portion in an axial direction. The stator includes a stator core including a plurality of teeth arranged to project radially outward, and a plurality of coils defined by a plurality of conducting wires wound around the teeth. Portions of the conducting wires which extend from the coils are drawn out downwardly of the base portion through the corresponding base through holes. The circuit board is in a shape of a strip, and includes: in one longitudinal end portion thereof, a plurality of power connection portions connected to an external power supply; in another longitudinal end portion thereof, a plurality of land portions to which the portions of the conducting wires drawn out downwardly of the base portion are connected; and a plurality of pattern portions electrically connected to the power connection portions and the land portions. The land portions include a first land portion, and a second land portion arranged adjacent to the first land portion. The pattern portions include a first pattern portion electrically connected to the first land portion, and a second pattern portion arranged adjacent to the first pattern portion in a widthwise direction of the circuit board, and electrically connected to the second land portion. The first and second land portions are arranged to overlap with each other when viewed in a longitudinal direction of the circuit board.

According to each of the above preferred embodiments of the present invention, in the circuit board, the land portions, to which the lead wires drawn out from the coils are connected, are arranged to overlap with one another when viewed in the longitudinal direction of the circuit board to achieve a reduction in the area of the circuit board while preventing a continuity between connection points. In addition, a reduction in rigidity of the motor can be minimized even in the case where the circuit board is arranged on a lower surface of the base portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially".

It is also assumed herein that an axial direction is a vertical direction, and that a side on which a stator is arranged with respect to a base portion is an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use. Also note that the wording "parallel direction" as used herein includes both parallel and substantially parallel directions. Also note that the wording "perpendicular direction" as used herein includes both perpendicular and substantially perpendicular directions.

1. First Preferred Embodiment

Figure 1:
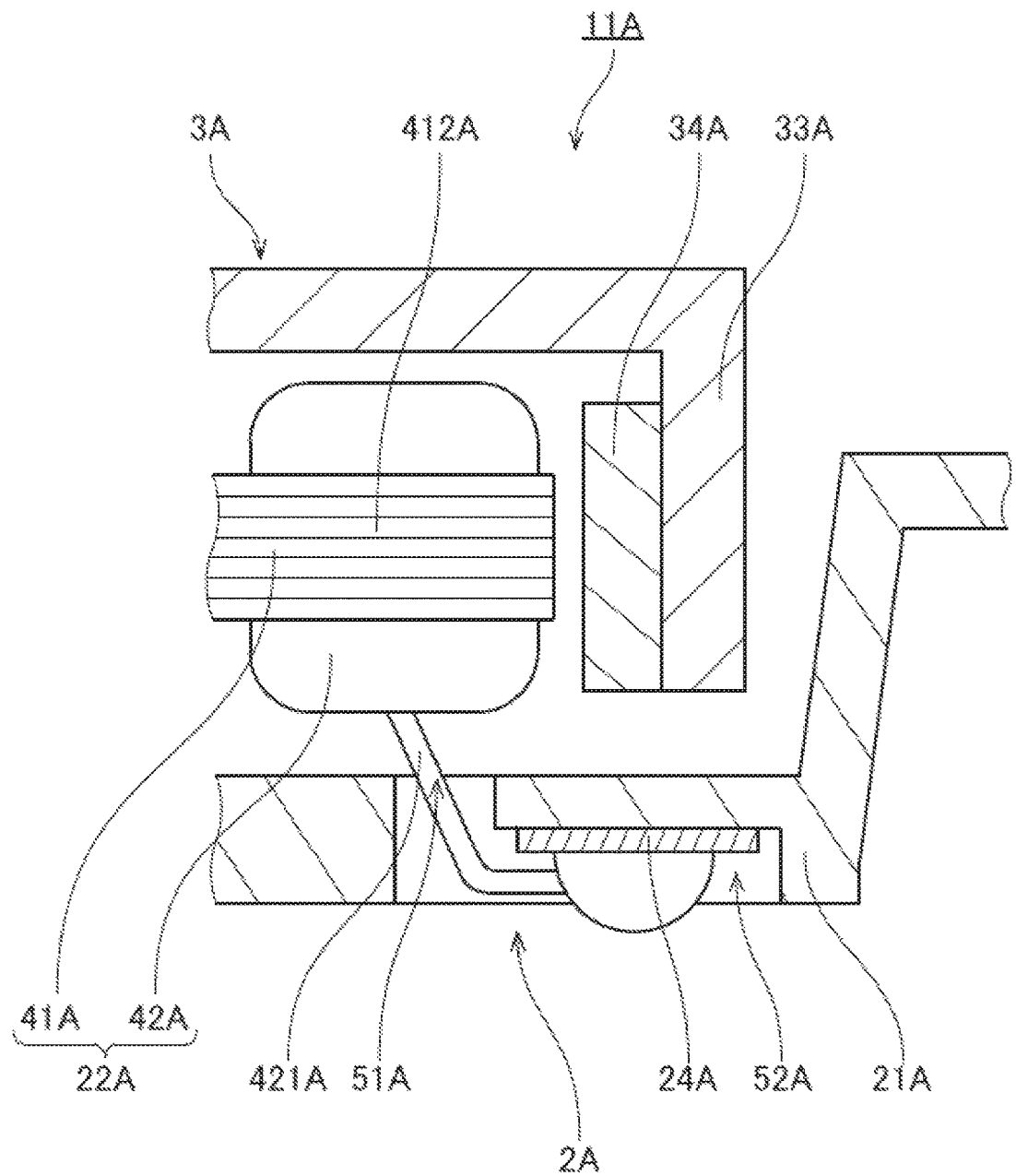
FIG. 1 is a partial vertical sectional view of a motor according to a first preferred embodiment of the present invention.

FIG. 1 is a vertical sectional view of a motor 11A according to a first preferred embodiment of the present invention. Referring to FIG. 1, the motor 11A includes a stationary portion 2A and a rotating portion 3A. The rotating portion 3A is supported to be rotatable about a central axis (not shown) extending in the vertical direction with respect to the stationary portion 2A.

The stationary portion 2A includes a base portion 21A, a stator 22A, and a circuit board 24A. The base portion 21A is a plate-shaped member arranged to extend perpendicularly to the vertical direction. The stator 22A is arranged above the base portion 21A, and is held by the base portion 21A. The circuit board 24A is arranged below the base portion 21A. The base portion 21A includes a plurality of base through holes 51A each of which passes through the base portion 21A in the axial direction.

The motor 11A according to the present preferred embodiment includes a base groove portion 52A recessed upward in a lower surface of the base portion 21A. The circuit board 24A is arranged inside the base groove portion 52A. This contributes to reducing the thickness of the stationary portion 2A.

The stator 22A includes a stator core 41A including a plurality of teeth 412A arranged to project radially outward, and a plurality of coils 42A arranged in a circumferential direction. A conducting wire is wound around each of the teeth 412A to define the coils 42A.

Referring to FIG. 1, portions of a plurality of conducting wires 421A which extend from the coils 42A are drawn out downwardly of the base portion 21A through the base through holes 51A. An end of each conducting wire 421A is connected to a land portion 50A of the circuit board 24A, which will be described below. The circuit board 24A is thus electrically connected to the coils 42A of the stator 22A.

The rotating portion 3A includes a hub 33A and a magnet 34A fixed to an inner circumferential surface of the hub 33A. While the motor 11A is running, a torque is produced by magnetic flux generated between the stator 22A and the magnet 34A.

Figure 2:
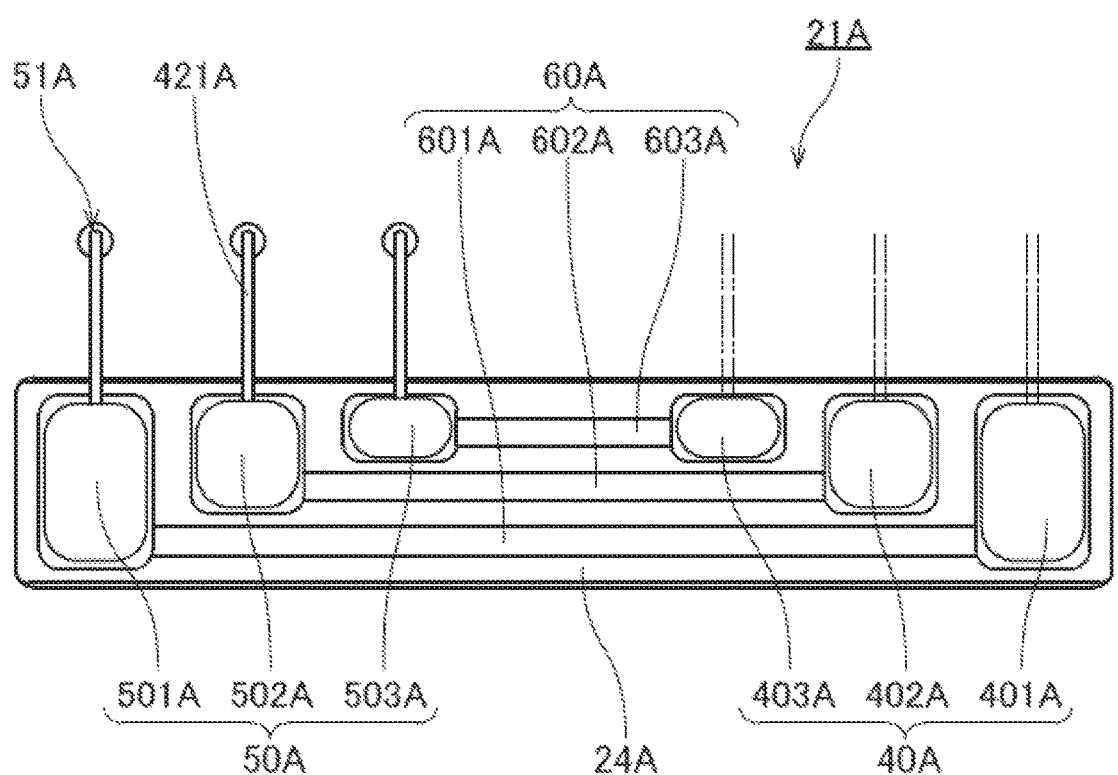
FIG. 2 is a partial bottom view of a base portion according to the first preferred embodiment.

FIG. 2 is a partial bottom view of the base portion 21A according to the first preferred embodiment. Referring to FIG. 2, the circuit board 24A is in the shape of a strip, and is arranged to extend along a tangent to an outer circumferential surface of the motor 11A. In addition, the circuit board 24A includes a plurality of power connection portions 40A, a plurality of land portions 50A, and a plurality of pattern portions 60A.

The power connection portions 40A are arranged in one longitudinal end portion of the circuit board 24A. The power connection portions 40A are a plurality of conductor patterns each of which has a copper foil exposed to be connected with an external power supply (not shown), and include a first power connection portion 401A, a second power connection portion 402A, and a third power connection portion 403A. The land portions 50A are arranged in another longitudinal end portion of the circuit board 24A. The land portions 50A are a plurality of conductor patterns to which the conducting wires 421A are connected, and include a first land portion 501A, a second land portion 502A, and a third land portion 503A.

Further, the pattern portions 60A are a plurality of conductor patterns electrically connected to the power connection portions 40A and the land portions 50A, and include a first pattern portion 601A, a second pattern portion 602A, and a third pattern portion 603A.

The first pattern portion 601A is arranged to electrically connect the first power connection portion 401A and the first land portion 501A to each other. The second pattern portion 602A is arranged to electrically connect the second power connection portion 402A and the second land portion 502A to each other. The third pattern portion 603A is arranged to electrically connect the third power connection portion 403A and the third land portion 503A to each other.

Referring to FIG. 2, the first and second land portions 501A and 502A are arranged adjacent to each other in a longitudinal direction of the circuit board 24A. In addition, the first pattern portion 601A, which is electrically connected to the first land portion 501A, and the second pattern portion 602A, which is electrically connected to the second land portion 502A, are arranged adjacent to each other in a widthwise direction of the circuit board 24A. Further, the first pattern portion 601A and the second land portion 502A are arranged to overlap with each other when viewed in the widthwise direction of the circuit board 24A. A reduction in the width of the circuit board 24A is thus achieved. This leads to a reduction in the area of the circuit board 24A.

Further, the area of a bottom surface of the base groove portion 52A can be reduced, and this contributes to minimizing a reduction in rigidity of the motor 11A even when the circuit board 24A is accommodated inside the base groove portion 52A. Furthermore, arranging the land portions 50A to overlap with one another when viewed in the longitudinal direction contributes to increasing a separation distance between adjacent ones of the land portions 50A when compared to the case where the land portions 50A are arranged in the widthwise direction. This in turn contributes to preventing a continuity between solders used when fixing the conducting wires 421A to the land portions 50A.

2. Second Preferred Embodiment

2-1. Structure of Disk Drive Apparatus

Figure 3:
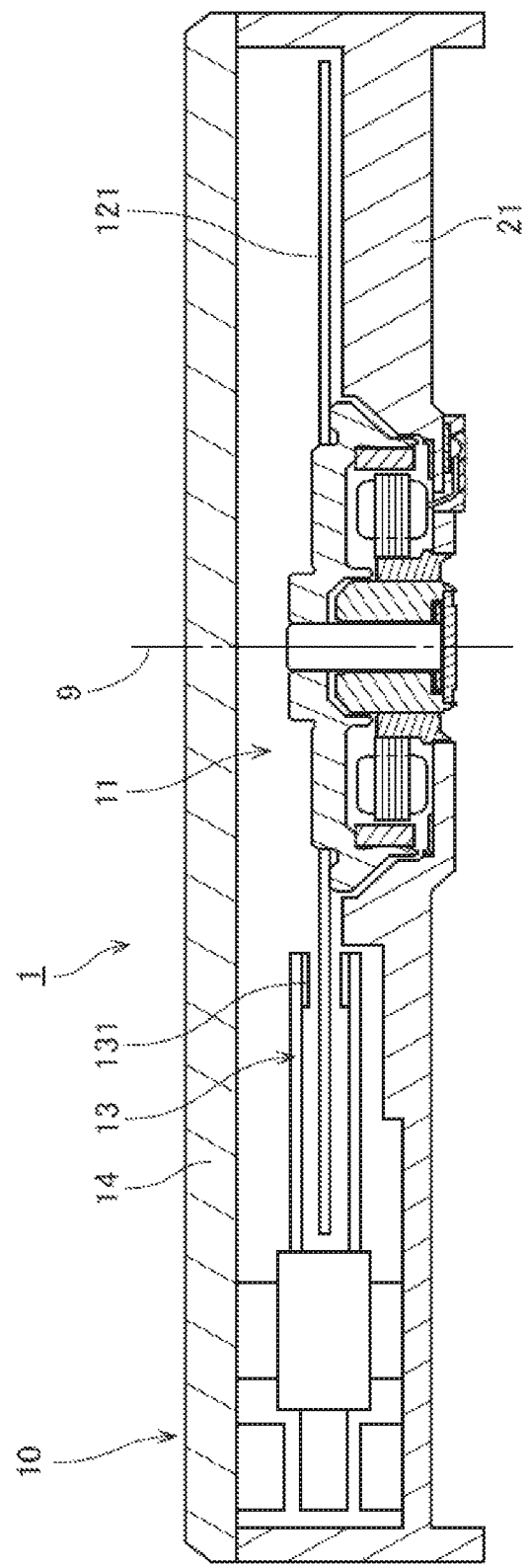
FIG. 3 is a vertical sectional view of a disk drive apparatus according to a second preferred embodiment of the present invention.

FIG. 3 is a vertical sectional view of a disk drive apparatus 1 according to a second preferred embodiment of the present invention. The disk drive apparatus 1 is an apparatus arranged to perform reading and writing of information from or to a magnetic disk 121 including a circular hole in a center thereof while rotating the magnetic disk 121. Referring to FIG. 3, the disk drive apparatus 1 includes a motor 11, the magnetic disk 121, an access portion 13, and a cover 14.

The motor 11 is arranged to rotate the magnetic disk 121 about a central axis 9 while supporting the magnetic disk 121. The motor 11 includes a base portion 21 arranged to extend radially below the magnetic disk 121. An upper side of the base portion 21 is covered with the cover 14.

At least a portion of the motor 11, the magnetic disk 121, and the access portion 13 are accommodated in a housing 10 made up of the base portion 21 and the cover 14. The access portion 13 is arranged to move heads 131 along recording surfaces of the magnetic disk 121 to perform at least one of the reading and the writing of information from or to the magnetic disk 121.

Note that, although the disk drive apparatus 1 according to the present preferred embodiment includes only one magnetic disk 121, a disk drive apparatus according to another preferred embodiment of the present invention may include two or more magnetic disks 121.

An interior space of the housing 10 is preferably a clean space with extremely little dirt or dust. According to the present preferred embodiment, the interior space of the housing 10 is filled with a clean air. Note, however, that the interior space of the housing 10 may alternatively be filled with a helium gas, a hydrogen gas, or a nitrogen gas instead of air. Also note that the interior space of the housing 10 may alternatively be filled with a mixture of any of these gases and air.

2-2. Structure of Motor

Figure 4:
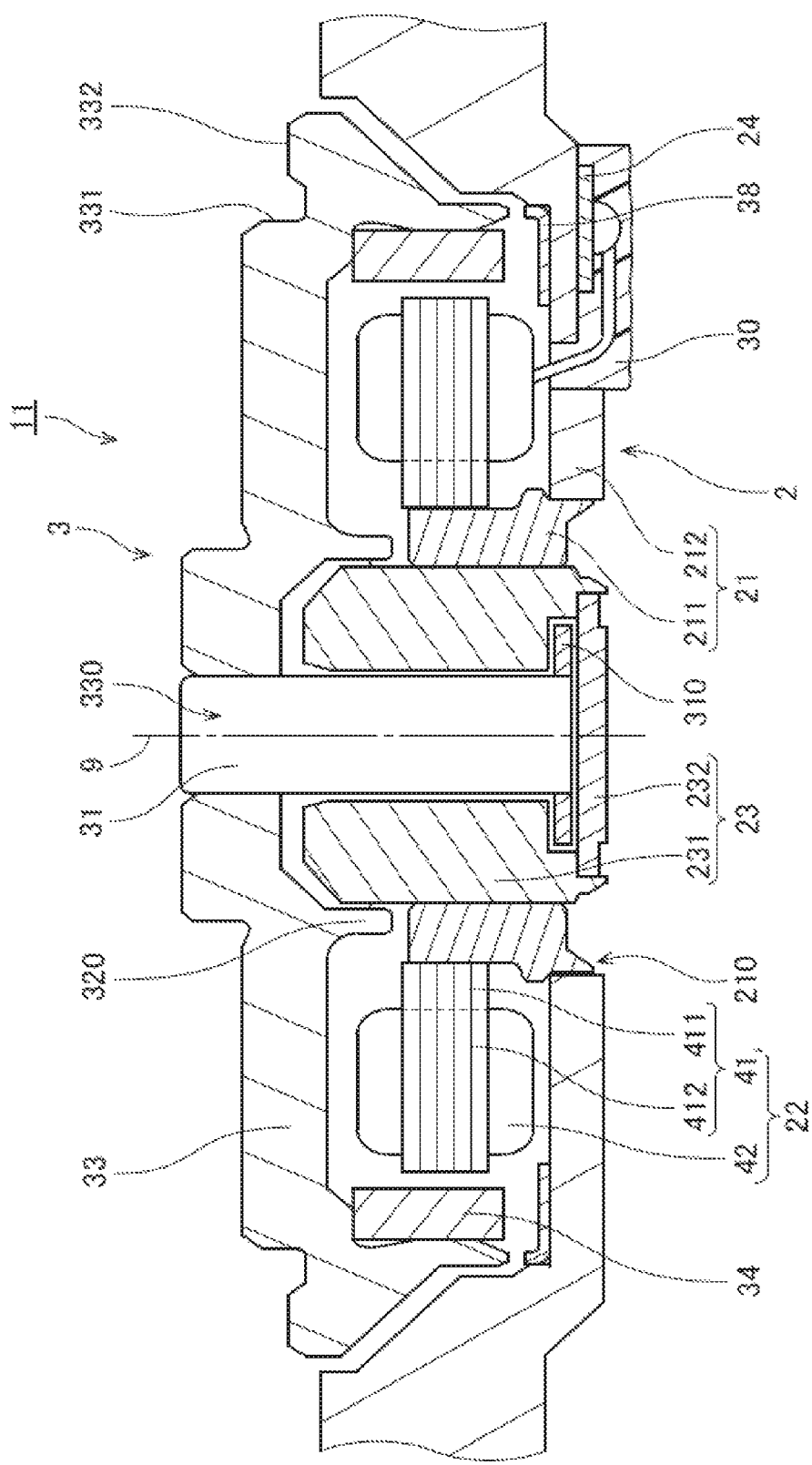
FIG. 4 is a vertical sectional view of a motor according to the second preferred embodiment.
Figure 5:
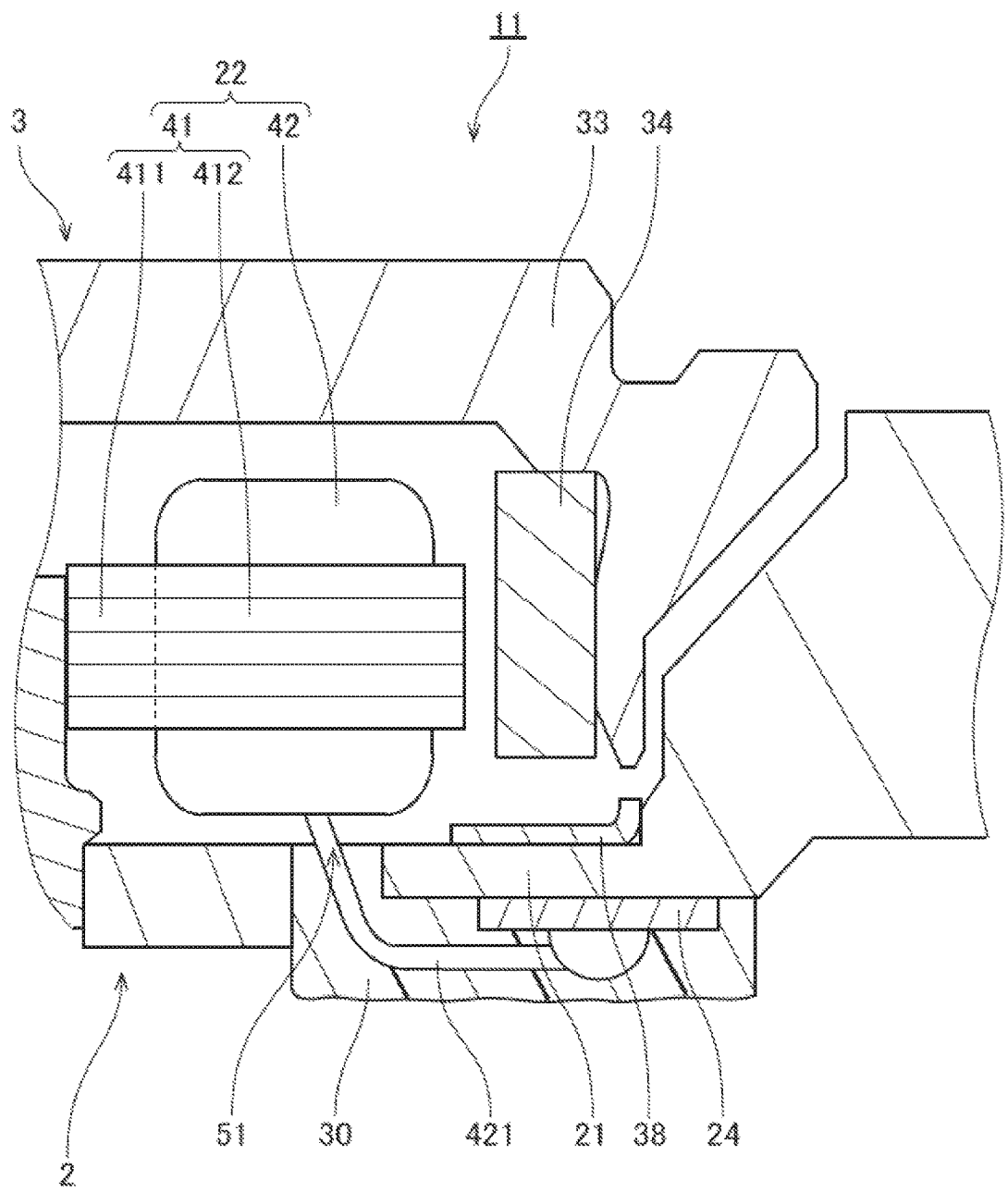
FIG. 5 is a partial vertical sectional view of the motor according to the second preferred embodiment.

Next, the structure of the motor 11 described above will now be described in more detail below. FIG. 4 is a vertical sectional view of the motor 11 according to the second preferred embodiment. FIG. 5 is a partial vertical sectional view of the motor 11 according to the second preferred embodiment. Referring to FIGS. 4 and 5, the motor 11 includes a stationary portion 2 and a rotating portion 3. The stationary portion 2 is arranged to be stationary relative to the base portion 21 and the cover of the disk drive apparatus 1. The rotating portion 3 is supported to be rotatable with respect to the stationary portion 2.

The stationary portion 2 according to the present preferred embodiment includes the base portion 21, a stator 22, a bearing 23, a circuit board 24, an adhesive 30, and a thrust yoke 38. The bearing 23 is arranged to rotatably support a shaft 31 of the rotating portion 3, which will be described below.

The base portion 21 is arranged to extend perpendicularly to the central axis 9 below the rotating portion 3, the magnetic disk 121, and the access portion 13. The base portion 21 includes a stator holder 211 and a base body 212.

The base body 212 is a plate-shaped member arranged to support the stator holder 211. A metal, such as, for example, an aluminum alloy or stainless steel, is used as a material of the base body 212. The base body 212 is arranged to extend radially outward from an outer circumference of the stator holder 211.

The base body 212 includes a circular through hole 210 in which a lower end portion of the stator holder 211 is fitted. When the motor 11 is used, the base body 212 is fixed to a frame of a device through, for example, screwing. Further, a lower surface of the base body 212 may include a base groove portion (not shown) recessed upward, and the circuit board 24, which will be described below, may be arranged inside this base groove portion. This leads to a reduction in the axial thickness of the stationary portion 2.

The stator holder 211 is a substantially cylindrical member extending in the axial direction. The lower end portion of the stator holder 211 is inserted in the through hole 210 of the base body 212, and is fixed to the base body 212 by crimping. Note, however, that the stator holder 211 may alternatively be fixed to the base body 212 by another method, such as, for example, welding. Also note that the base body 212 and the stator holder 211 may alternatively be defined by a single continuous monolithic member.

Referring to FIG. 5, the base body 212 includes base through holes 51 each of which passes through the base body 212 in the axial direction. As described below, the number of base through holes 51 provided in the present preferred embodiment is three, but the number of base through holes 51 may alternatively be less than three or more than three.

The stator 22 is an armature including a stator core 41 and a plurality of coils 42. The stator 22 is arranged above at least a portion of the base portion 21. The stator core 41 is defined by, for example, laminated steel sheets, that is, electromagnetic steel sheets, such as silicon steel sheets, placed one upon another in the axial direction. The stator core is fixed to an outer circumferential surface of the stator holder 211 through, for example, an adhesive.

In addition, the stator core 41 includes an annular core back 411 and a plurality of teeth 412 arranged to project radially outward from the core back 411. The coils 42 are a collection of conducting wires wound around the teeth 412. The teeth 412 and the coils 42 are preferably arranged in an annular shape and at substantially regular intervals in a circumferential direction about the central axis 9.

The coils 42 according to the present preferred embodiment are defined by three conducting wires 421 each of which is arranged to supply an electric current for a separate one of three phases of the three-phase motor 11. An end portion of each conducting wire 421 is drawn out downwardly of a lower surface of the base portion 21 through one of the base through holes 51.

The bearing 23 includes a sleeve 231 arranged to extend in the axial direction to assume a substantially cylindrical shape around the shaft 31, and a disk-shaped cap 232 arranged to close an opening at a lower end of the sleeve 231. A lower portion of the sleeve 231 is inserted into a space radially inside of the stator holder 211, and is fixed to the stator holder 211 through, for example, an adhesive. An upper end portion of the sleeve 231 is arranged axially above an upper end portion of the stator holder 211 and an upper end portion of the stator 22. An inner circumferential surface of the sleeve 231 is arranged radially opposite to an outer circumferential surface of the shaft 31. Note that the sleeve 231 may be defined by a plurality of members.

The circuit board 24 is arranged on the lower surface of the base body 212. Three land portions 50 (which will be described in detail below), each of which has an exposed copper foil, are arranged on a lower surface of the circuit board 24. Each of the three conducting wires 421 drawn out through the base through holes 51 is fixed to a corresponding one of the three land portions 50 through a solder. The circuit board 24 and the coils 42 are thus electrically connected to each other. Electric drive currents for the motor 11 are supplied from an external power supply (not shown) to the coils 42 through the circuit board 24.

Note that the number of conducting wires 421 drawn out through the base through holes 51 is not limited to three. For example, four conducting wires may alternatively be drawn out through the base through holes 51.

A flexible printed circuit (FPC) board, which has flexibility, is used as the circuit board 24 according to the present preferred embodiment. Use of the flexible printed circuit board allows the circuit board 24 to be arranged along the lower surface of the base portion 21, which may be uneven. In addition, the use of the flexible printed circuit board leads to a reduction in the axial thickness of the circuit board 24 itself compared to the case where a circuit board of another type is used. This in turn leads to an additional reduction in the axial thickness of the motor 11.

Referring to FIGS. 4 and 5, at least a portion of the lower surface of the circuit board 24 is covered with the adhesive 30. This contributes to preventing a faulty electrical continuity, such as, for example, an electrical short circuit, from occurring between adjacent ones of the land portions 50, the conducting wires 421, and the base portion 21.

The thrust yoke 38 is an annular member arranged on an upper surface of the base body 212. A magnetic material, such as, for example, an electromagnetic steel sheet (e.g., a silicon steel sheet), a ferromagnetic stainless steel (e.g., SUS430), or a cold-rolled steel sheet (e.g., SPCC or SPCE), is used as a material of the thrust yoke 38. The thrust yoke 38 is arranged below a magnet 34, which will be described below. A magnetic attraction force is generated between the thrust yoke 38 and the magnet 34. The rotating portion 3 is thus attracted toward the stationary portion 2.

The rotating portion 3 according to the present preferred embodiment includes the shaft 31, a hub 33, and the magnet 34. The shaft 31 is a columnar member arranged to extend in the axial direction radially inside of the sleeve 231, and arranged to be substantially coaxial with the central axis 9. A metal, such as, for example, a ferromagnetic or nonmagnetic stainless steel, is used as a material of the shaft 31. An upper end portion of the shaft 31 is arranged to project upward above an upper surface of the sleeve 231.

The outer circumferential surface of the shaft 31 and the inner circumferential surface of the sleeve 231 are arranged radially opposite to each other with a slight gap therebetween. In addition, a disk-shaped shaft annular portion 310 arranged to extend radially outward from a lower end of the shaft 31 is fixed to a lower portion of the shaft 31. An upper surface of the shaft annular portion 310 and a lower surface of the sleeve 231 are arranged axially opposite to each other with a slight gap therebetween. A lower surface of the shaft annular portion 310 and an upper surface of the cap 232 are arranged axially opposite to each other with a slight gap therebetween. Note that the shaft 31 and the shaft annular portion 310 may alternatively be defined by a single monolithic member. Also note that the shaft 31 and the hub 33, which will be described below, may alternatively be defined by a single monolithic member.

The hub 33 is arranged to extend radially outward from a peripheral portion of the upper end portion of the shaft 31 to assume an annular shape around the central axis 9. An aluminum alloy or a ferromagnetic or nonmagnetic stainless steel, for example, is used as a material of the hub 33. A through hole 330 passing through the hub 33 in the axial direction is defined radially inside of the hub 33. The upper end portion of the shaft 31 is press fitted in the through hole 330, and is thus fixed to the hub 33.

Referring to FIG. 4, the hub 33 according to the present preferred embodiment includes an annular projecting portion 320 arranged to project downward. An inner circumferential surface of the annular projecting portion 320 is arranged radially opposite to an outer circumferential surface of the sleeve 231.

The hub 33 further includes a substantially cylindrical first holding surface 331, and a second holding surface 332 arranged to extend radially outward from a lower end portion of the first holding surface 331. An inner circumferential portion of the magnetic disk 121 is arranged to be in contact with at least a portion of the first holding surface 331. In addition, a lower surface of the magnetic disk 121 is arranged to be in contact with at least a portion of the second holding surface 332. The magnetic disk 121 is thus held.

The magnet 34 is fixed to an inner circumferential surface of the hub 33 through, for example, an adhesive. An annular permanent magnet is used as the magnet 34 according to the present preferred embodiment. The magnet 34 is substantially cylindrical, and is arranged radially outside of the stator 22. An inner circumferential surface of the magnet 34 includes north and south poles arranged to alternate with each other in the circumferential direction. In addition, the inner circumferential surface of the magnet 34 is arranged radially opposite to a radially outer end surface of each of the teeth 412 with a slight gap therebetween. Note that a plurality of magnets may be used in place of the annular magnet 34. In the case where the plurality of magnets are used, the magnets are arranged on the inner circumferential surface of the hub 33 such that pole surfaces of the north poles and pole surfaces of the south poles alternate with each other in the circumferential direction.

A lubricating fluid is arranged continuously in a gap between the bearing 23 and a combination of the shaft 31 and the hub 33 described above. A liquid surface of the lubricating fluid is defined between the outer circumferential surface of the sleeve 231 and the inner circumferential surface of the annular projecting portion 320. Note that the liquid surface of the lubricating fluid may alternatively be defined between the inner circumferential surface of the sleeve 231 and the outer circumferential surface of the shaft 31. A polyolester oil or a diester oil, for example, is used as the lubricating fluid. The shaft 31 is supported through the lubricating fluid to be rotatable with respect to the bearing 23, and is arranged to rotate about the central axis 9 while the motor 11 is running.

That is, a bearing mechanism according to the present preferred embodiment is defined by a combination of the sleeve 231 and the cap 232, which are members of the stationary portion 2, a combination of the shaft 31 and the hub 33, which are members of the rotating portion 3, and the lubricating fluid arranged therebetween. Note, however, that the motor 11 may alternatively be arranged to include a bearing having another structure, such as, for example, a plain bearing or a ball bearing, instead of the fluid dynamic bearing mechanism.

Once, in the motor 11 described above, the electric drive currents are supplied to the coils 42 through the circuit board 24, magnetic flux is generated around each of the teeth 412. Then, interaction between the magnetic flux of the teeth 412 and magnetic flux of the magnet 34 produces a circumferential torque between the stationary portion 2 and the rotating portion 3, so that the rotating portion 3 is caused to rotate about the central axis 9 with respect to the stationary portion 2. The magnetic disk 121 supported by the hub 33 is caused to rotate about the central axis 9 together with the rotating portion 3.

2-3. Structure of Circuit Board

Next, the structure of the circuit board 24, including paths of the conducting wires 421 from the coils 42 to the land portions 50, will now be described in detail below.

Figure 6:
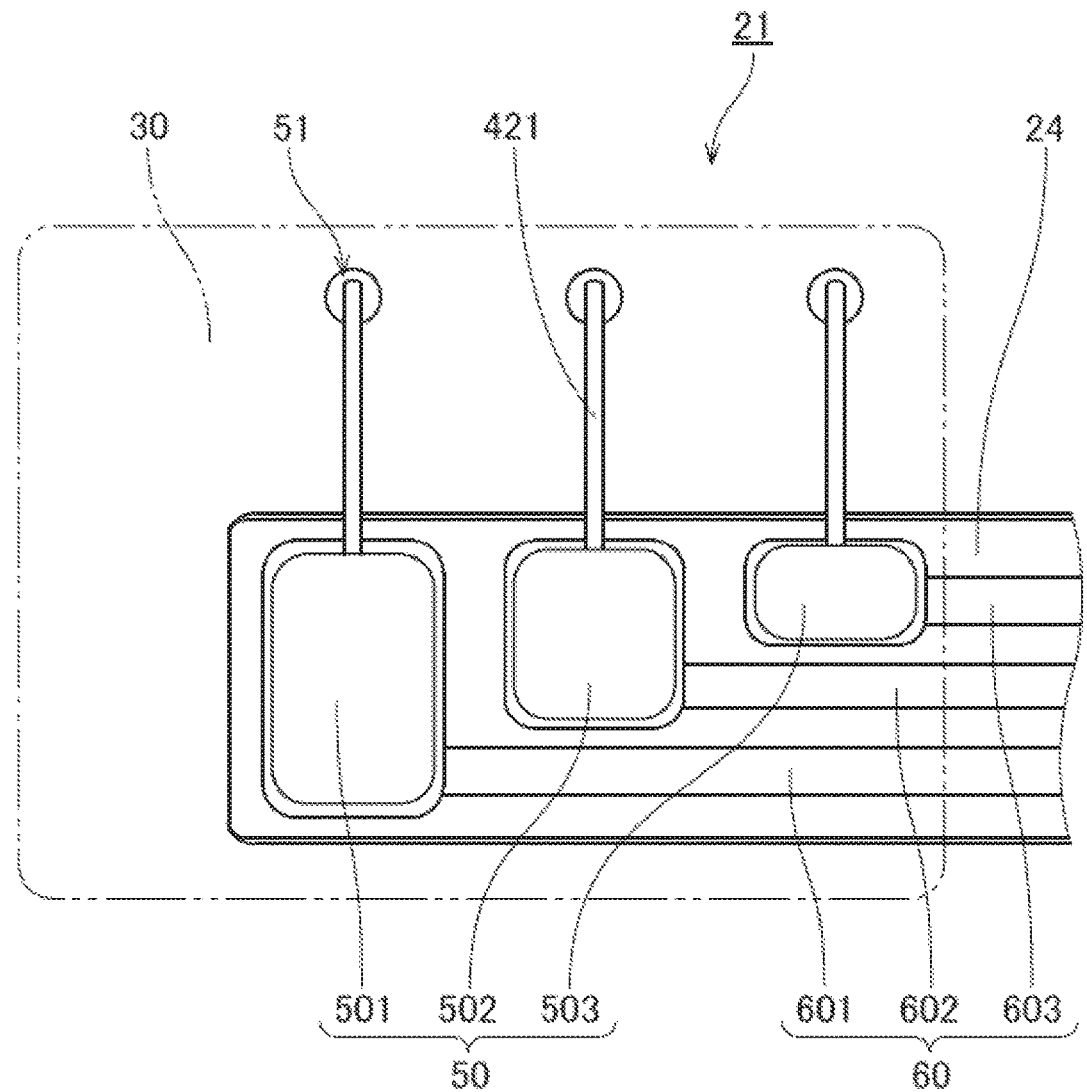
FIG. 6 is a partial bottom view of a base portion according to the second preferred embodiment.
Figure 7:
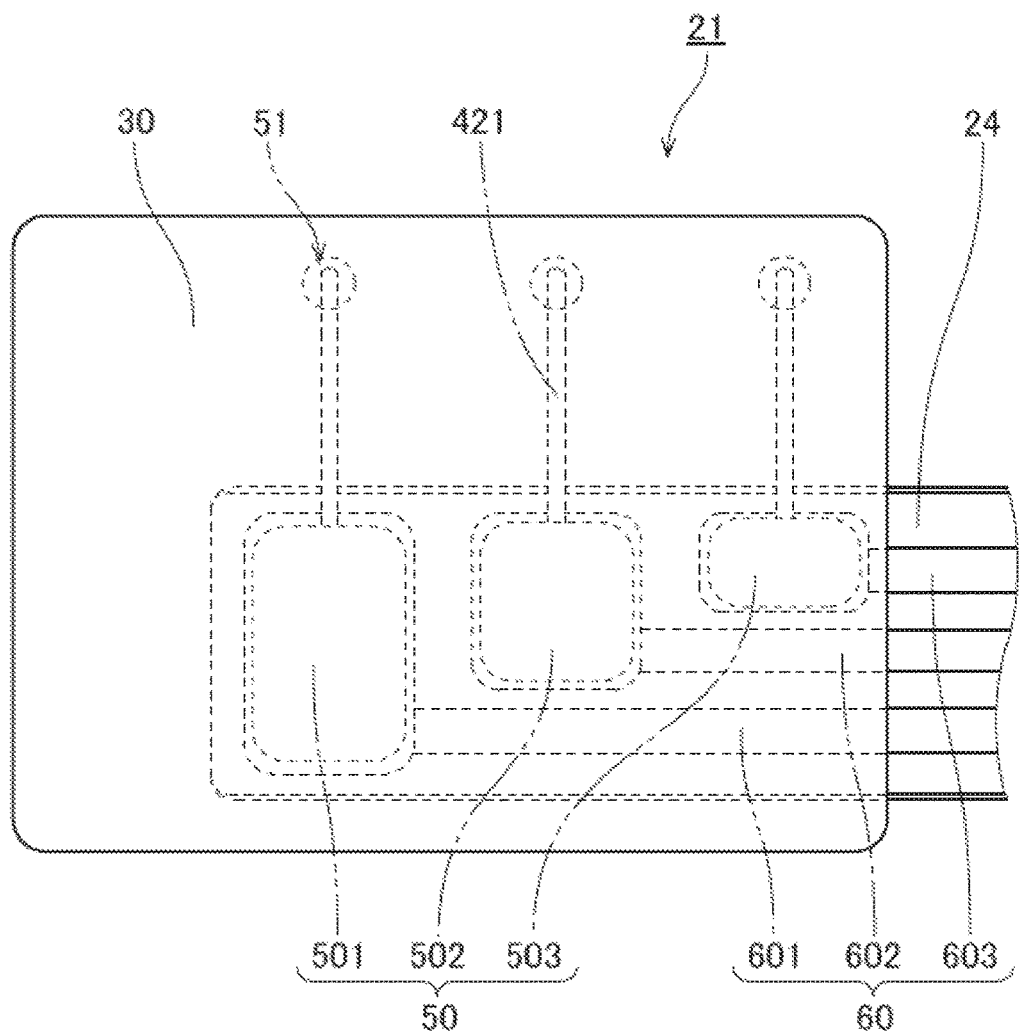
FIG. 7 is a partial bottom view of the base portion according to the second preferred embodiment.

Each of FIGS. 6 and 7 is a partial bottom view of the base portion 21 according to the second preferred embodiment. Note that the adhesive 30 is not shown in FIG. 6, whereas the adhesive 30 is shown in FIG. 7. Hereinafter, reference will be made to FIGS. 4 and 5 appropriately as well as FIGS. 6 and 7.

Referring to FIG. 6, the circuit board 24 is in the shape of a strip, and is elongated along a tangent to an outer circumferential surface of the motor 11. In addition, the circuit board 24 is rectangular, is elongated in the longitudinal direction, and has a constant width. This leads to a reduction in scrap when the circuit boards 24 are stamped out in a manufacturing process, resulting in a reduced production cost. Note, however, that the shape of the circuit board 24 is not limited to the above-described shape.

On the lower surface of the circuit board 24, the three land portions 50, three pattern portions 60, and three power connection portions 40, which will be described below, are arranged in a direction away from a position near the coils 42. Note that each of the number of land portions 50, the number of pattern portions 60, and the number of power connection portions 40 may alternatively be two or more than three.

The three land portions 50 are arranged in a longitudinal end portion of the circuit board 24 on a side closer to the coils 42. Each land portion 50 is a conductor pattern to which a separate one of the three conducting wires 421 extending from the coils 42 and drawn out downwardly of the base portion 21 through the base through holes 51 is connected. The three land portions 50 include a first land portion 501, a second land portion 502, and a third land portion 503.

The three pattern portions 60 are three conductor patterns each of which is electrically connected to a separate one of the three land portions 50 and a separate one of the three power connection portions 40, which will be described below. The three pattern portions 60 include a first pattern portion 601, a second pattern portion 602, and a third pattern portion 603.

Referring to FIGS. 6 and 7, the dimension of the first land portion 501 as measured in the widthwise direction of the circuit board 24 is greater than the dimension of the second land portion 502 as measured in the widthwise direction, and the dimension of the second land portion 502 as measured in the widthwise direction is greater than the dimension of the third land portion 503 as measured in the widthwise direction. This arrangement allows the first, second, and third land portions 501, 502, and 503 to be arranged sequentially and adjacent to one another in the longitudinal direction of the circuit board 24 such that the first, second, and third land portions 501, 502, and 503 overlap with one another when viewed in the longitudinal direction.

Further, the above arrangement also allows the first pattern portion 601, which is electrically connected to the first land portion 501, the second pattern portion 602, which is electrically connected to the second land portion 502, and the third pattern portion 603, which is electrically connected to the third land portion 503, to be arranged sequentially and adjacent to one another in the widthwise direction of the circuit board 24.

Furthermore, the above arrangement also allows the first pattern portion 601 to overlap with each of the second and third land portions 502 and 503 when viewed in the widthwise direction of the circuit board 24. Furthermore, the above arrangement also allows the second pattern portion 602 to overlap with the third land portion 503 when viewed in the widthwise direction of the circuit board 24.

A reduction in the width of the circuit board 24 is thus achieved. This leads to a reduction in the area of the circuit board 24. Further, arranging the land portions 50 to overlap with one another when viewed in the longitudinal direction contributes to increasing a separation distance between adjacent ones of the land portions 50 when compared to the case where the land portions 50 are arranged in the widthwise direction. This in turn contributes to preventing a continuity between the solders used when fixing the conducting wires 421 to the land portions 50. Furthermore, the reduction in the area of the circuit board 24 allows a reduction in the size of a bottom surface of the above-described base groove portion in the case where the circuit board 24 is accommodated inside the base groove portion. This contributes to minimizing a reduction in rigidity of the motor 11.

Furthermore, the three base through holes 51 and the three land portions 50 are both arranged in parallel with the tangent to the outer circumferential surface of the motor 11. This allows the three conducting wires 421 extending from the coils 42 and drawn out downwardly of the base portion 21 through the base through holes 51 to extend parallel to one another and to be connected to the respective land portions 50. This contributes to more effectively preventing a faulty electrical continuity from occurring between adjacent ones of the land portions 50 or between adjacent ones of the conducting wires 421.

In the present preferred embodiment, the adhesive 30 is arranged to cover the three land portions 50, at least portions of the three conducting wires 421 drawn out through the base through holes 51, and the three base through holes 51 on the lower surface of the base portion 21. This provides electrical isolation between adjacent ones of the base through holes 51, the conducting wires 421, and the land portions 50, and contributes to preventing a faulty electrical continuity due to a contact therebetween.

Figure 8:
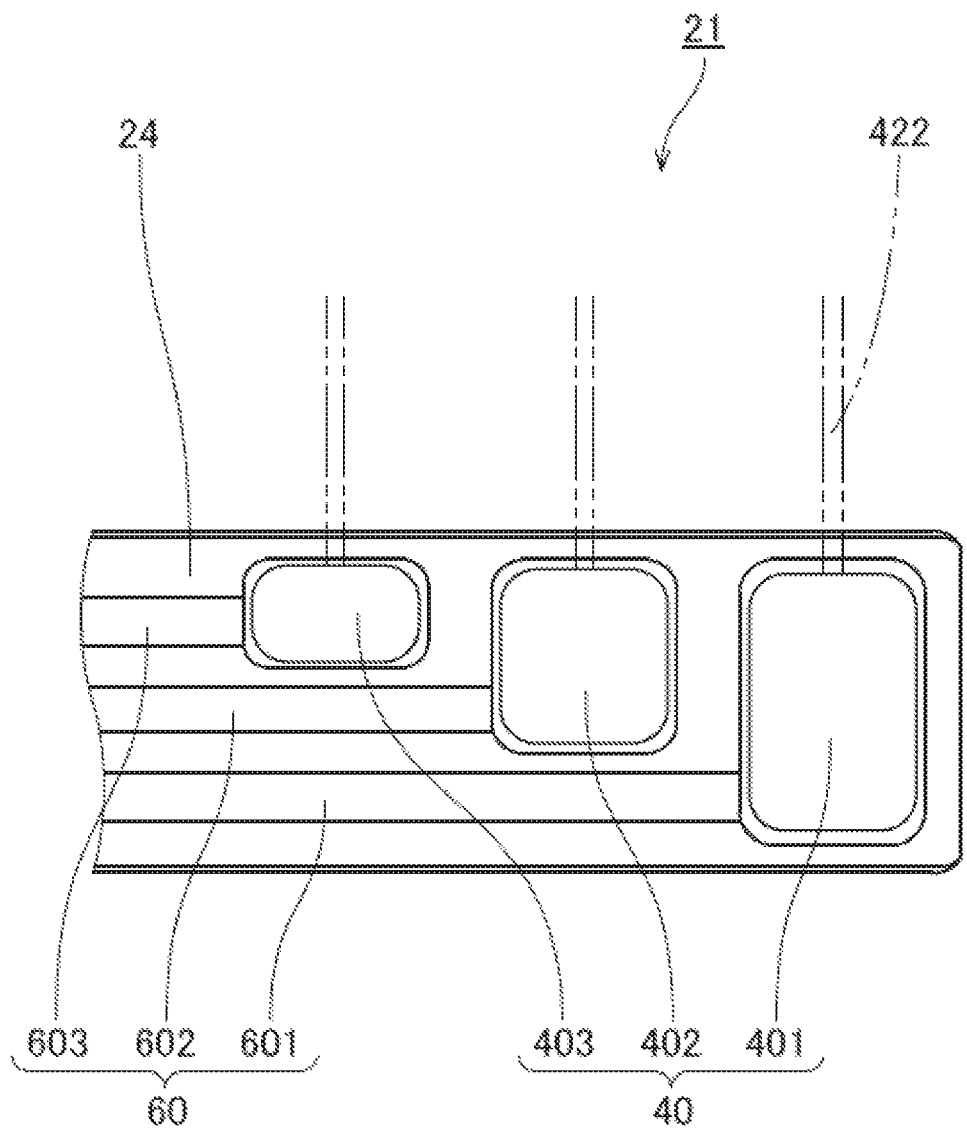
FIG. 8 is a partial bottom view of the base portion according to the second preferred embodiment.

Next, FIG. 8 is a partial bottom view of the base portion 21 according to the second preferred embodiment, also illustrating portions of power wires 422 used to connect the circuit board 24 with the external power supply (not shown). Hereinafter, reference will be made to FIGS. 6 and 7 appropriately as well as FIG. 8.

Referring to FIG. 8, the three power connection portions 40 are arranged on a lower surface of another longitudinal end portion of the circuit board 24. The three power connection portions 40 are a plurality of conductor patterns each of which has a copper foil exposed to be connected with the external power supply (not shown) through a corresponding one of the power wires 422. The three power connection portions 40 include a first power connection portion 401, a second power connection portion 402, and a third power connection portion 403.

The dimension of the first power connection portion 401 as measured in the widthwise direction of the circuit board 24 is greater than the dimension of the second power connection portion 402 as measured in the widthwise direction, and the dimension of the second power connection portion 402 as measured in the widthwise direction is greater than the dimension of the third power connection portion 403 as measured in the widthwise direction. This arrangement allows the first, second, and third power connection portions 401, 402, and 403 to be arranged sequentially and adjacent to one another in the longitudinal direction of the circuit board 24, with the first power connection portion 401 being closest to an adjacent longitudinal end of the circuit board 24, such that the first, second, and third power connection portions 401, 402, and 403 overlap with one another when viewed in the longitudinal direction.

A reduction in the width of the circuit board 24 is thus achieved. This leads to a reduction in the area of the circuit board 24. In addition, arranging the power connection portions 40 to overlap with one another when viewed in the longitudinal direction contributes to increasing a separation distance between adjacent ones of the power connection portions 40 when compared to the case where the power connection portions are arranged in the widthwise direction. This in turn contributes to preventing a continuity between solders used when fixing the power wires 422 to the power connection portions 40.

Further, referring to FIGS. 6 to 8, from one end of the circuit board 24, the first land portion 501, the second land portion 502, and the third land portion 503, which have increasingly smaller dimensions as measured in the widthwise direction of the circuit board 24, are arranged in the order named and adjacent to one another, while from another end of the circuit board 24, the first power connection portion 401, the second power connection portion 402, and the third power connection portion 403, which have increasingly smaller dimensions as measured in the widthwise direction of the circuit board 24, are arranged in the order named and adjacent to one another.

This allows the first pattern portion 601, which is electrically connected to the first land portion 501 and the first power connection portion 401, the second pattern portion 602, which is electrically connected to the second land portion 502 and the second power connection portion 402, and the third pattern portion 603, which is electrically connected to the third land portion 503 and the third power connection portion 403, to be arranged parallel to and adjacent to one another with a sufficient separation distance therebetween.

This contributes to more effectively preventing a faulty electrical continuity from occurring between adjacent ones of the three pattern portions 60 due to a contact therebetween. Further, it is made possible to arrange the circuit board 24 to be rectangular and have a reduced width, and this leads to a reduction in scrap when the circuit boards 24 are stamped out in the manufacturing process, resulting in a reduced production cost.

3. Example Modifications

While preferred embodiments of the present invention have been described above, it is to be understood that the present invention is not limited to the above-described preferred embodiments.

Figure 9:
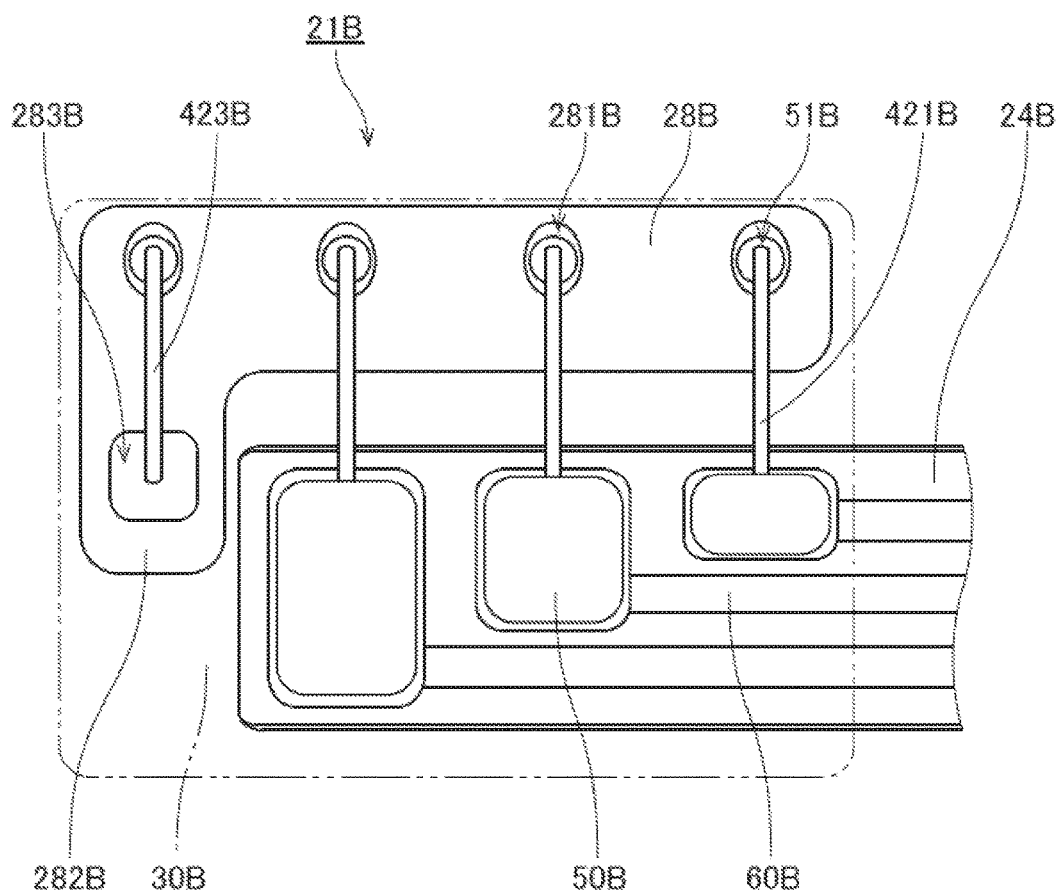
FIG. 9 is a partial bottom view of a base portion according to a modification of the second preferred embodiment.

FIG. 9 is a partial bottom view of a base portion 21B, also illustrating paths of conducting wires 421B from coils (not shown) to land portions 50B, according to a modification of the second preferred embodiment. In FIG. 9, an adhesive 30B is not shown.

In the modification illustrated in FIG. 9, an insulating bushing portion 28B is additionally arranged below a plurality of base through holes 51B to cover the base through holes 51B. In addition, a plurality of bushing through holes 281B, each of which passes through the insulating bushing portion 28B in the axial direction, are defined in the insulating bushing portion 28B at positions axially overlapping with the base through holes 51B. Portions of the conducting wires 421B which extend from the coils are drawn out downwardly of the base portion 21B through the corresponding base through holes 51B and the corresponding bushing through holes 281B.

The adhesive 30B is arranged below the base portion 21B to cover a lower surface of the insulating bushing portion 28B, at least portions of the conducting wires 421B drawn out from the coils, the land portions 50B, and at least portions of a plurality of pattern portions 60B. This improves insulation of the conducting wires 421B.

The insulating bushing portion 28B preferably includes a projecting portion 282B arranged to project in the widthwise direction of a circuit board 24B, and including a recessed portion 283B recessed axially upward from a lower surface of the projecting portion 282B. This allows at least a portion of at least one of the conducting wires 421B drawn out downwardly of the base portion 21B to be accommodated inside the recessed portion 283B. In particular, when a common wire 423B, such as, for example, an earth wire, is accommodated inside the recessed portion 283B, a ground for a motor including the circuit board 24B can be easily established through the recessed portion 283B.

Figure 10:
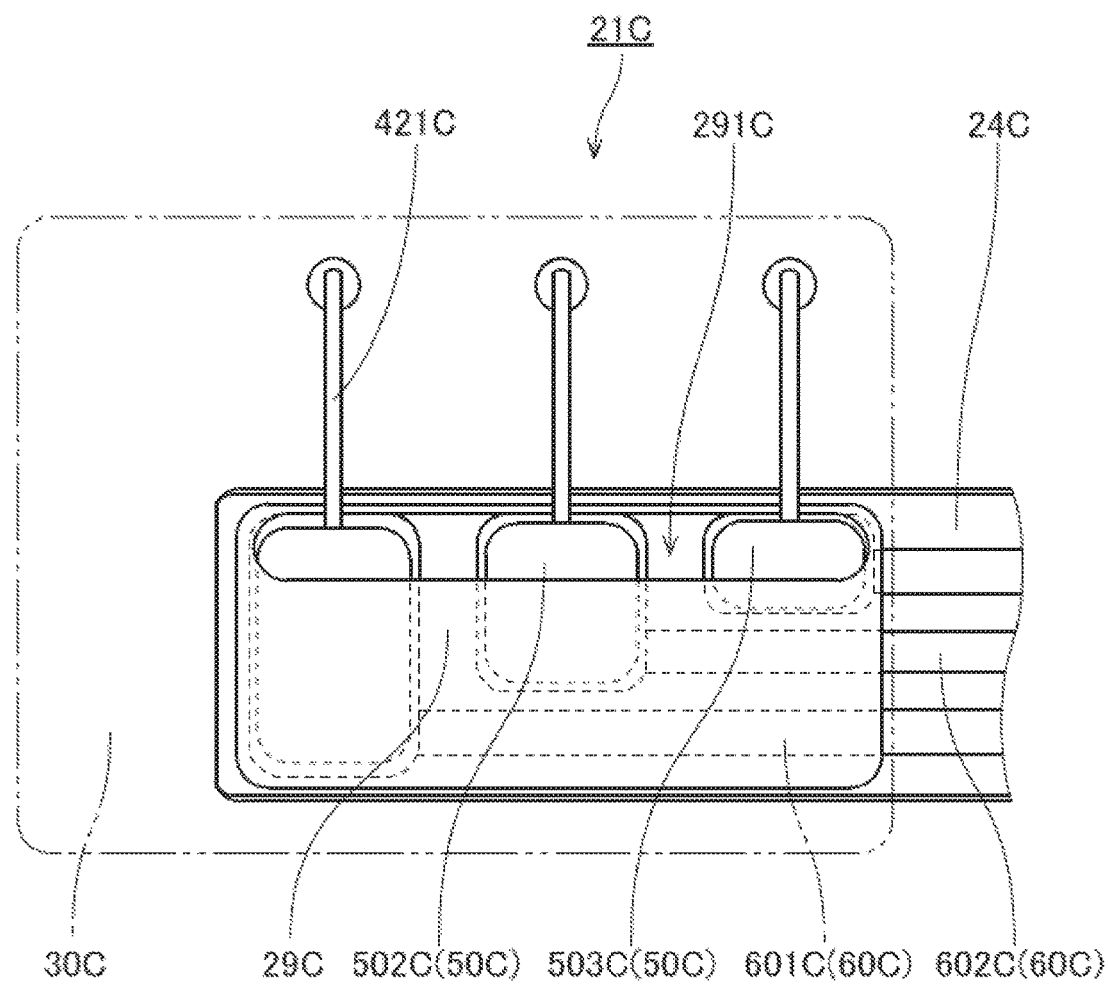
FIG. 10 is a partial bottom view of a base portion according to another modification of the second preferred embodiment.

FIG. 10 is a partial bottom view of a base portion 21C, also illustrating paths of conducting wires 421C from coils (not shown) to land portions 50C, according to a modification of the second preferred embodiment. In FIG. 10, an adhesive 30C is not shown.

In the modification illustrated in FIG. 10, an insulation sheet portion 29C is additionally arranged on a lower surface of a circuit board 24C. At least portions of a plurality of pattern portions 60C and the land portions 50C are covered with the insulation sheet portion 29C on the lower side. This contributes to preventing a faulty electrical continuity from occurring, for example, between a first pattern portion 601C and a second land portion 502C, which are arranged adjacent to each other in the widthwise direction of the circuit board 24C, or between a second pattern portion 602C and a third land portion 503C, which are arranged adjacent to each other in the widthwise direction of the circuit board 24C.

The adhesive 30C is arranged below the base portion 21C to cover at least portions of the conducting wires 421C and the insulation sheet portion 29C. In addition, a sheet through hole 291C, which passes through the insulation sheet portion 29C in the axial direction, is defined in the insulation sheet portion 29C at a position axially overlapping with positions at which the conducting wires 421C are fixed to the land portions 50C. The conducting wires 421C are soldered to the corresponding land portions 50C in the sheet through hole 291C. This prevents a solder from causing unevenness or a gap between the insulation sheet portion 29C and the circuit board 24C.

Note that a motor and a disk drive apparatus according to a preferred embodiment of the present invention may be arranged to rotate a disk other than the magnetic disk, such as, for example, an optical disk.

Also note that the detailed shape of any member may be different from the shape thereof as illustrated in the accompanying drawings of the present application.

Also note that features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion; and
a rotating portion arranged to be rotatable about a central axis extending in a vertical direction; wherein
the stationary portion includes:
    a plate-shaped base portion arranged to extend perpendicularly to the vertical direction;
    a stator arranged above the base portion; and
    a circuit board arranged below the base portion;
the base portion includes a plurality of base through holes each of which passes through the base portion in an axial direction;
the stator includes:
    a stator core including a plurality of teeth arranged to project radially outward; and
    a plurality of coils defined by a plurality of conducting wires wound around the teeth;
portions of the conducting wires which extend from the coils are drawn out downwardly of the base portion through the corresponding base through holes;
the circuit board is in a shape of a strip, and includes:
    in one longitudinal end portion thereof, a plurality of power connection portions connected to an external power supply;
    in another longitudinal end portion thereof, a plurality of land portions to which the portions of the conducting wires drawn out downwardly of the base portion are connected; and
    a plurality of pattern portions electrically connected to the power connection portions and the land portions;
the land portions include:
    a first land portion; and
    a second land portion arranged adjacent to the first land portion;
the pattern portions include:
    a first pattern portion electrically connected to the first land portion; and
    a second pattern portion arranged adjacent to the first pattern portion, and electrically connected to the second land portion; and
the first pattern portion and the second land portion are arranged to overlap with each other when viewed in a widthwise direction of the circuit board.

2. The motor according to claim 1, wherein the circuit board is rectangular, and is elongated in a longitudinal direction thereof.

3. The motor according to claim 1, wherein
the base through holes are arranged in parallel with a tangent to an outer circumferential surface of the motor; and
the land portions are also arranged in parallel with the tangent to the outer circumferential surface of the motor.

4. The motor according to claim 1, wherein a dimension of the first land portion as measured in the widthwise direction is greater than a dimension of the second land portion as measured in the widthwise direction.

5. The motor according to claim 4, wherein
the land portions further include a third land portion arranged adjacent to the second land portion, and arranged to overlap with the second pattern portion when viewed in the widthwise direction of the circuit board; and
a dimension of the third land portion as measured in the widthwise direction is smaller than the dimension of each of the first and second land portions as measured in the widthwise direction.

6. The motor according to claim 1, wherein the circuit board is arranged to have a constant width.

7. The motor according to claim 1, wherein the power connection portions are arranged to overlap with one another when viewed in a longitudinal direction of the circuit board.

8. The motor according to claim 1, wherein
the stationary portion further includes an insulating bushing portion arranged below the base through holes;
the insulating bushing portion includes a plurality of bushing through holes each of which passes through the insulating bushing portion in the axial direction; and
the portions of the conducting wires which extend from the coils are drawn out downwardly of the base portion through the corresponding base through holes and the corresponding bushing through holes.

9. The motor according to claim 8, wherein
the insulating bushing portion further includes a projecting portion arranged to project in the widthwise direction of the circuit board;
the projecting portion includes a recessed portion recessed axially upward from a lower surface thereof; and
at least a portion of at least one of the portions of the conducting wires drawn out downwardly of the base portion is accommodated inside the recessed portion.

10. The motor according to claim 1, wherein
the stationary portion further includes an insulation sheet portion arranged on a lower surface of the circuit board; and
at least portions of the pattern portions and the land portions are covered with the insulation sheet portion.

11. A motor comprising:
a stationary portion; and
a rotating portion arranged to be rotatable about a central axis extending in a vertical direction; wherein
the stationary portion includes:
    a plate-shaped base portion arranged to extend perpendicularly to the vertical direction;
    a stator arranged above the base portion; and
    a circuit board arranged below the base portion;
the base portion includes a plurality of base through holes each of which passes through the base portion in an axial direction;
the stator includes:
    a stator core including a plurality of teeth arranged to project radially outward; and
    a plurality of coils defined by a plurality of conducting wires wound around the teeth;
portions of the conducting wires which extend from the coils are drawn out downwardly of the base portion through the corresponding base through holes;

the circuit board is in a shape of a strip, and includes:
in one longitudinal end portion thereof, a plurality of power connection portions connected to an external power supply;
in another longitudinal end portion thereof, a plurality of land portions to which the portions of the conducting wires drawn out downwardly of the base portion are connected; and
a plurality of pattern portions electrically connected to the power connection portions and the land portions;
the land portions include:
a first land portion; and
a second land portion arranged adjacent to the first land portion;
the pattern portions include:
a first pattern portion electrically connected to the first land portion; and
a second pattern portion arranged adjacent to the first pattern portion in a widthwise direction of the circuit board, and electrically connected to the second land portion; and
the first and second land portions are arranged to overlap with each other when viewed in a longitudinal direction of the circuit board.

12. The motor according to claim 11, wherein the circuit board is rectangular, and is elongated in the longitudinal direction thereof.

13. The motor according to claim 11, wherein
the base through holes are arranged in parallel with a tangent to an outer circumferential surface of the motor; and
the land portions are also arranged in parallel with the tangent to the outer circumferential surface of the motor.

14. The motor according to claim 11, wherein a dimension of the first land portion as measured in the widthwise direction is greater than a dimension of the second land portion as measured in the widthwise direction.

15. The motor according to claim 14, wherein
the land portions further include a third land portion arranged adjacent to the second land portion, and arranged to overlap with the second land portion when viewed in the longitudinal direction of the circuit board; and
a dimension of the third land portion as measured in the widthwise direction is smaller than the dimension of each of the first and second land portions as measured in the widthwise direction.

16. The motor according to claim 11, wherein the circuit board is arranged to have a constant width.

17. The motor according to claim 11, wherein the power connection portions are arranged to overlap with one another when viewed in the longitudinal direction of the circuit board.

18. The motor according to claim 11, wherein
the stationary portion further includes an insulating bushing portion arranged below the base through holes;
the insulating bushing portion includes a plurality of bushing through holes each of which passes through the insulating bushing portion in the axial direction; and
the portions of the conducting wires which extend from the coils are drawn out downwardly of the base portion through the corresponding base through holes and the corresponding bushing through holes.

19. The motor according to claim 18, wherein
the insulating bushing portion further includes a projecting portion arranged to project in the widthwise direction of the circuit board;
the projecting portion includes a recessed portion recessed axially upward from a lower surface thereof; and
at least a portion of at least one of the portions of the conducting wires drawn out downwardly of the base portion is accommodated inside the recessed portion.

20. The motor according to claim 11, wherein
the stationary portion further includes an insulation sheet portion arranged on a lower surface of the circuit board; and
at least portions of the pattern portions and the land portions are covered with the insulation sheet portion.

* * * * *